(12) United States Patent
Andruskiewicz, IV et al.

(10) Patent No.: US 12,502,948 B2
(45) Date of Patent: Dec. 23, 2025

(54) AUGMENTED COOLING OF ELECTRIC VEHICLE

(71) Applicant: GM GLOBAL TECHNOLOGY OPERATIONS LLC, Detroit, MI (US)

(72) Inventors: Peter Paul Andruskiewicz, IV, Ann Arbor, MI (US); Neeraj S. Shidore, Novi, MI (US); Chih-hung Yen, Bloomfield Hills, MI (US); Satish P. Ketkar, Troy, MI (US); Justin Skorski, Swartz Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 18/304,832

(22) Filed: Apr. 21, 2023

(65) Prior Publication Data
US 2024/0351427 A1 Oct. 24, 2024

(51) Int. Cl.
*B60K 11/02* (2006.01)
*B60K 1/00* (2006.01)
*B60K 1/04* (2019.01)

(52) U.S. Cl.
CPC .......... *B60K 11/02* (2013.01); *B60K 1/04* (2013.01); *B60K 2001/005* (2013.01); *B60K 2001/006* (2013.01)

(58) Field of Classification Search
CPC .... B60K 11/02; B60K 1/04; B60K 2001/005; B60K 2001/006
USPC ........................................................ 180/65.1
See application file for complete search history.

(56) References Cited

U.S. PATENT DOCUMENTS

| 9,105,951 | B2* | 8/2015 | Anderson-Straley ........................ H01M 10/613 |
| 9,878,703 | B2* | 1/2018 | Kava ......................... B60K 6/48 |
| 11,390,137 | B2* | 7/2022 | Mackenzie ......... H01M 10/613 |
| 11,433,736 | B2* | 9/2022 | Sathasivam ........ B60H 1/00878 |
| 2008/0295535 | A1* | 12/2008 | Robinet .............. H01M 10/663 62/259.2 |
| 2010/0012295 | A1* | 1/2010 | Nemesh ............ H01M 10/6568 165/104.19 |
| 2014/0014421 | A1* | 1/2014 | Carpenter .......... B60H 1/00278 237/28 |
| 2014/0062228 | A1* | 3/2014 | Carpenter .............. B60K 11/02 310/53 |

(Continued)

FOREIGN PATENT DOCUMENTS

WO WO-2012077062 A1 * 6/2012 ......... B60H 1/00278

*Primary Examiner* — Hau V Phan
(74) *Attorney, Agent, or Firm* — CANTOR COLBURN LLP

(57) ABSTRACT

A cooling system for a rechargeable energy storage system (RESS) of a vehicle includes a coolant circuit configured to direct a coolant flow through the RESS to remove thermal energy from the RESS, and a refrigerant circuit through which a flow of refrigerant is circulated. A chiller is fluidly connected to the coolant circuit and the refrigerant circuit and is configured to transfer thermal energy between the coolant circuit and the refrigerant circuit. An auxiliary circuit is fluidly connected to the coolant circuit. The auxiliary circuit is configured to selectably direct at least a portion of the coolant flow across a first side of a cold plate for thermal energy exchange with a phase change material located at a second side of the cold plate. One or more valves are configured to selectably direct the at least a portion of the coolant flow through the auxiliary circuit.

20 Claims, 6 Drawing Sheets

(56) References Cited

U.S. PATENT DOCUMENTS

2020/0338998 A1\* 10/2020 Wainwright ............ B60L 58/26
2023/0046910 A1    2/2023 Shidore et al.

\* cited by examiner

AUGMENTED COOLING OF ELECTRIC VEHICLE

INTRODUCTION

The subject disclosure relates to electrically-powered vehicles, and more particularly to cooling of rechargeable energy storage systems, such as battery packs of the electric vehicle.

Sustained high-current or high-load events, such as direct current fast charging (DCFC) of the vehicle or sustained uphill towing operations or high performance driving of the vehicle are typically rare in vehicle operations, but can tax the vehicle cooling system's ability to reject the heat generated by the rechargeable energy storage system (RESS). Sizing of the refrigerant circuit components of the cooling system, such as the compressor, condenser and other components, for these rare operational conditions adds additional weight and size to the vehicle where constraints are already very tight.

Accordingly, it is desirable to provide improvements to the coolant system, which minimizes the increase in weight and size.

SUMMARY

In one exemplary embodiment, a cooling system for a rechargeable energy storage system (RESS) of a vehicle includes a coolant circuit configured to direct a coolant flow through the RESS to remove thermal energy from the RESS, and a refrigerant circuit through which a flow of refrigerant is circulated. A chiller is fluidly connected to the coolant circuit and the refrigerant circuit and is configured to transfer thermal energy between the coolant circuit and the refrigerant circuit. An auxiliary circuit is fluidly connected to the coolant circuit. The auxiliary circuit is configured to selectably direct at least a portion of the coolant flow across a first side of a cold plate for thermal energy exchange with a phase change material located at a second side of the cold plate. One or more valves are configured to selectably direct the at least a portion of the coolant flow through the auxiliary circuit.

In addition to one or more of the features described herein, the one or more valves is a spool valve.

In addition to one or more of the features described herein, the phase change material is one or more of ice, or frozen brine.

In addition to one or more of the features described herein, the auxiliary circuit is fluidly connected to the to the coolant circuit between the RESS and the chiller.

In addition to one or more of the features described herein, an ambient heat exchanger is located in the coolant circuit between the RESS and the one or more valves.

In addition to one or more of the features described herein, a RESS bypass pathway is operably connected to the one or more valves to selectably bypass the coolant flow around the RESS.

In another exemplary embodiment, a vehicle includes a body, an electric motor supported relative to the body, and a rechargeable energy storage system (RESS) operably connected to the electric motor. A cooling system is operably connected to the RESS, including a coolant circuit configured to direct a coolant flow through the RESS to remove thermal energy from the RESS, and a refrigerant circuit through which a flow of refrigerant is circulated. A chiller is fluidly connected to the coolant circuit and the refrigerant circuit and is configured to transfer thermal energy between the coolant circuit and the refrigerant circuit. An auxiliary circuit is fluidly connected to the coolant circuit. The auxiliary circuit is configured to selectably direct at least a portion of the coolant flow across a first side of a cold plate for thermal energy exchange with a phase change material located at a second side of the cold plate. One or more valves are configured to selectably direct the at least a portion of the coolant flow through the auxiliary circuit.

In addition to one or more of the features described herein, the one or more valves is a spool valve.

In addition to one or more of the features described herein, the phase change material is one or more of ice, or frozen brine.

In addition to one or more of the features described herein, the auxiliary circuit is fluidly connected to the to the coolant circuit between the RESS and the chiller.

In addition to one or more of the features described herein, an ambient heat exchanger is positioned in the coolant circuit between the RESS and the one or more valves.

In addition to one or more of the features described herein a RESS bypass pathway is operably connected to the one or more valves to selectably bypass the coolant flow around the RESS.

In addition to one or more of the features described herein, the phase change material is positioned in a compartment of the body.

In addition to one or more of the features described herein, the cold plate is positioned at one or more of a bottom or side of the compartment.

In yet another exemplary embodiment, a method of operating a cooling system of a rechargeable energy storage system (RESS) of a vehicle includes directing a coolant flow of a coolant circuit from a chiller through the RESS to remove thermal energy from the RESS, and selectably directing at least a portion of the coolant flow across a first side of a cold plate located fluidly upstream of the chiller for thermal energy exchange with a phase change material located at a second side of the cold plate to increase a thermal energy rejection capability of the coolant flow.

In addition to one or more of the features described herein, the selectable direction of at least a portion of the coolant flow is based on a determination that the vehicle is experiencing a high heat rejection event.

In addition to one or more of the features described herein, the high heat rejection event is one or more of direct current fast charging, high load towing or high performance driving.

In addition to one or more of the features described herein, the phase change material is one or more of ice, or frozen brine.

In addition to one or more of the features described herein, thermal energy is exchanged between the coolant flow and a refrigerant flow of a refrigerant circuit at the chiller.

In addition to one or more of the features described herein, a first portion of the coolant flow is directed across the cold plate and a second portion of the coolant flow bypasses the cold plate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
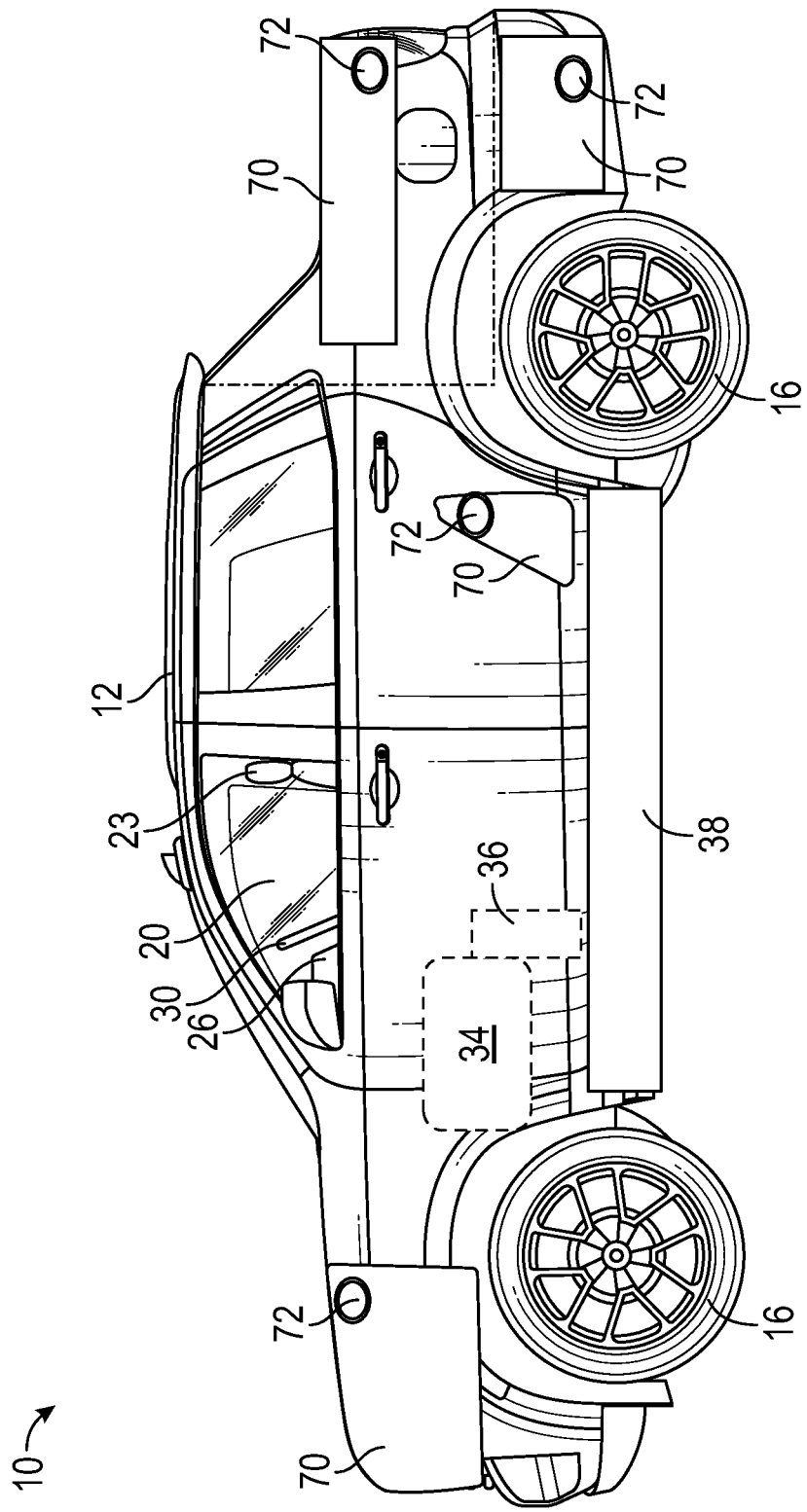
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. That is, changing a position of two of the plurality of wheels 16 relative to body 12 will cause vehicle 10 to change direction. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Vehicle 10 includes an electric motor 34 connected to a transmission 36 that provides power to one or more of the plurality of wheels 16. A rechargeable energy storage system (RESS) 38 or battery assembly provides power to electric motor 34.

Figure 2:
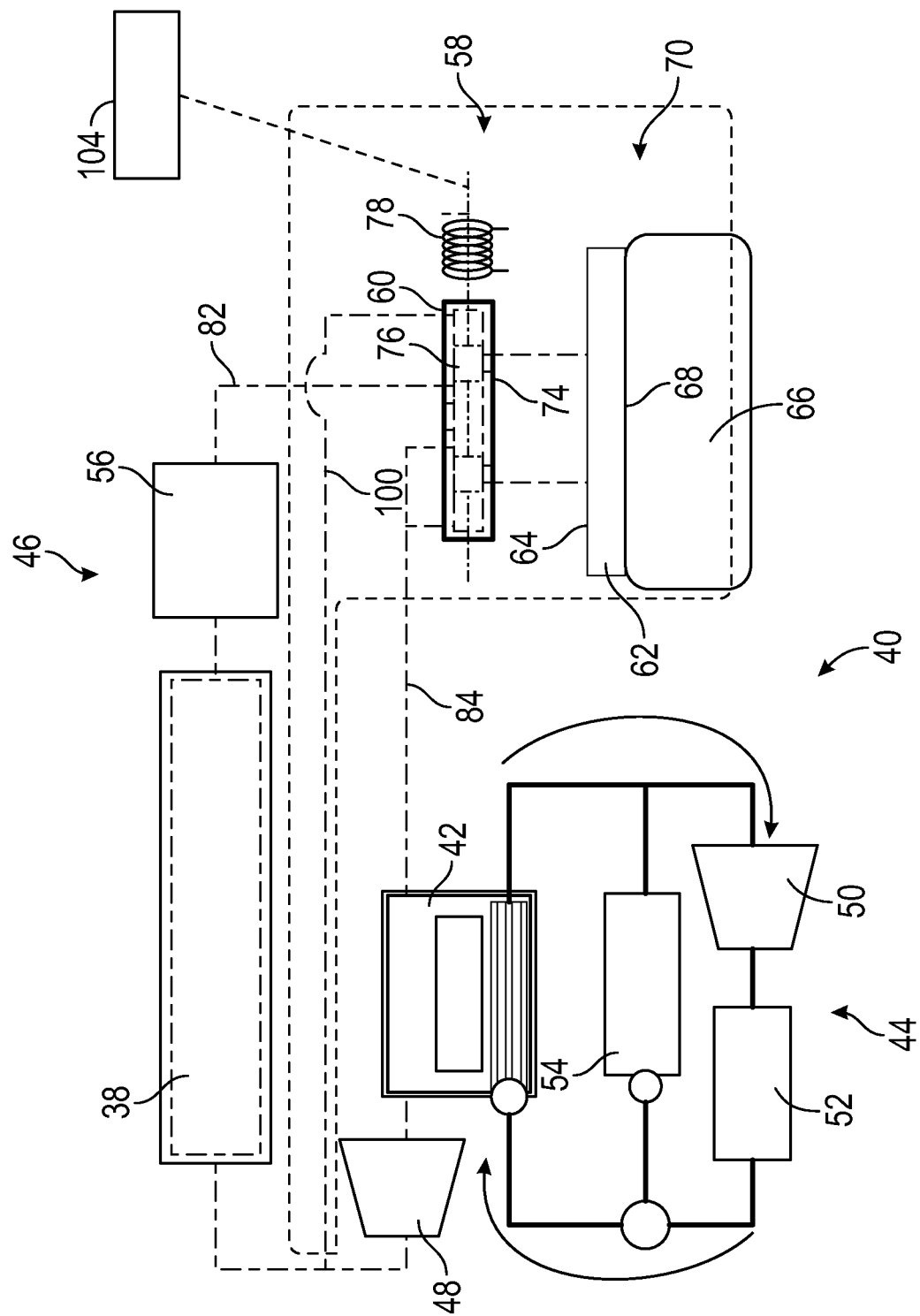
FIG. 2 is a schematic illustration of an embodiment cooling system of a rechargeable energy storage system (RESS)

Referring now to FIG. 2, a cooling system 40 is operably connected to the RESS 38 for thermal management of the RESS 38. The cooling system 40 includes a chiller 42 at which thermal energy is exchanged between a refrigerant circuit 44 and a RESS coolant circuit 46. The refrigerant circuit 44 circulates a flow of refrigerant through a compressor 50 and a condenser 52, and in some embodiments an evaporator 54 arranged in series with the compressor 50 and the condenser 52. In some embodiments, the evaporator 54 is arranged in a fluidly parallel relationship with the chiller 42 such that the flow of refrigerant is selectably directed through one or more of the chiller 42 or the evaporator 54. In the RESS coolant circuit 46, a flow of coolant such as water and ethylene glycol or immersion fluid, or other coolant fluid exchanges thermal energy with the flow of refrigerant at the chiller 42 and is directed through the RESS 38 to cool the RESS 38. Some of the thermal energy absorbed by the flow of coolant at the RESS 38 is then rejected at an ambient heat exchanger 56. In some embodiments, the coolant is urged through the RESS coolant circuit 46 via a coolant pump 48. When charging and the vehicle 10 is stationary, the majority of heat is rejected through the chiller 42. The ambient heat exchanger 56 is typically used when the vehicle 10 is in motion and the ambient temperature is much lower than the RESS temperature, which covers most driving conditions. However, high-load conditions may tax both the ambient heat exchanger 46 and the chiller 42.

The cooling system 40 includes an auxiliary circuit 58 connected to the RESS coolant circuit 46. The flow of coolant is selectably directed through the RESS coolant circuit 46 and the auxiliary circuit 58 depending on the cooling demands of the RESS 38 and the user-selected mode of operation. In some embodiments, the flow of coolant is controlled by operation of a spool valve 60. One skilled in the art will readily appreciate that the spool valve 60 is merely exemplary, and that other valves or combinations of valves may be utilized to control the flow of coolant through the cooling system 40, to selectably direct the flow of coolant through the auxiliary circuit 58.

In the embodiment illustrated in FIG. 2, the spool valve 60 is located fluidly between the ambient heat exchanger 56 and the chiller 42, and selectably directs the flow of coolant through a cold plate 62 or other auxiliary heat exchanger. The cold plate 62 facilitates the exchange of thermal energy between the flow of coolant at a hot side 64 of the cold plate 62 and a volume of phase change material (PCM) 66 located at a cold side 68 of the cold plate 62. The PCM 66, such as ice, brine, or other material, absorbs thermal energy from the flow of coolant, thus further cooling the flow of coolant prior to the flow of coolant entering the chiller 42.

Referring again to FIG. 1, in some embodiments the PCM 66, such as ice or other material, is located in an existing vehicle compartment 70, such as one or more cavities located in the vehicle body 12, with the cold plate 62 located at the compartment 70, such as at a bottom of the compartment 70, and/or along one or more sides of the compartment 70. A temperature sensor 72 may be located at the compartment 70 to monitor a temperature of the PCM 66, and/or one or more temperature sensors may be located in other locations along the RESS coolant circuit 46 and the auxiliary circuit 58 to monitor a temperature of the flow of coolant.

The spool valve 60 includes a valve housing 74 having multiple inlets and outlets to convey the flow of coolant through the valve housing 74. A valve piston 76 is located in the valve housing 74 and is movable via, for example, a motor 78 or other device, to open or close one or more of the inlets or outlets, to selectable direct the flow of coolant therethrough, as will be described in the following examples.

Figure 3:
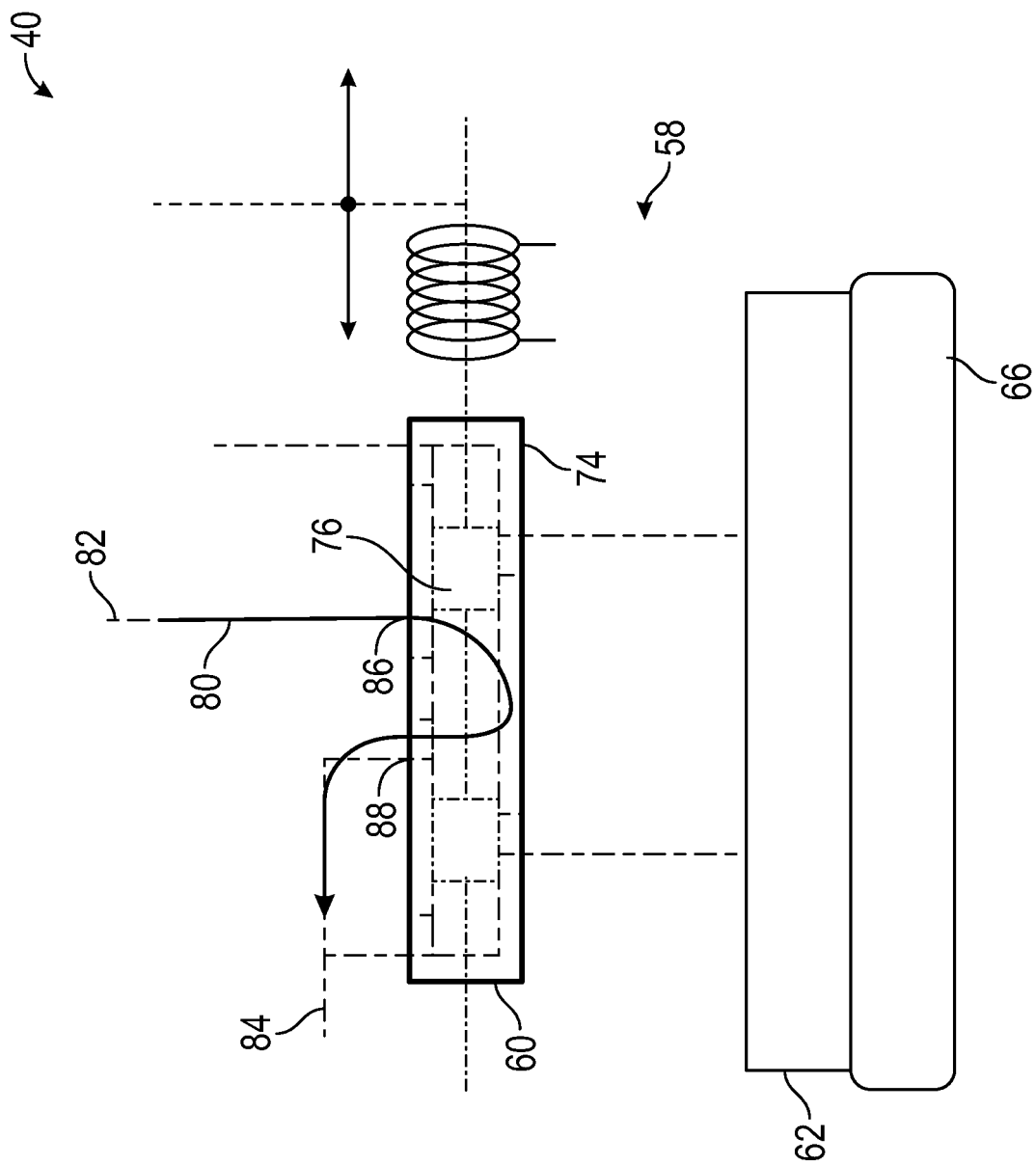
FIG. 3 is an illustration of an operational mode of a cooling system of an RESS.

A number of operating scenarios of the cooling system 40 will now be described with continued reference to FIG. 2 and additionally to FIGS. 3-5. Illustrated in FIG. 3 is operation of the cooling system 40 in a first mode or "normal mode". In the first mode, the spool valve 60 is operated such that the flow of coolant, shown as 80, is directed from the RESS 38 via a RESS outlet pathway 82 toward the chiller 42 via a chiller pathway 84, bypassing the cold plate 62. The flow of coolant 80 enters the valve housing 74 via a first inlet 86 connected to the RESS outlet pathway 82 and the valve piston 76 is positioned such that the flow of coolant 80 exits the valve housing 74 via a first outlet 88 connected to the chiller pathway 84. This provides normal cooling of the RESS 38 via circulation of the flow of coolant through the chiller 42.

Figure 4:
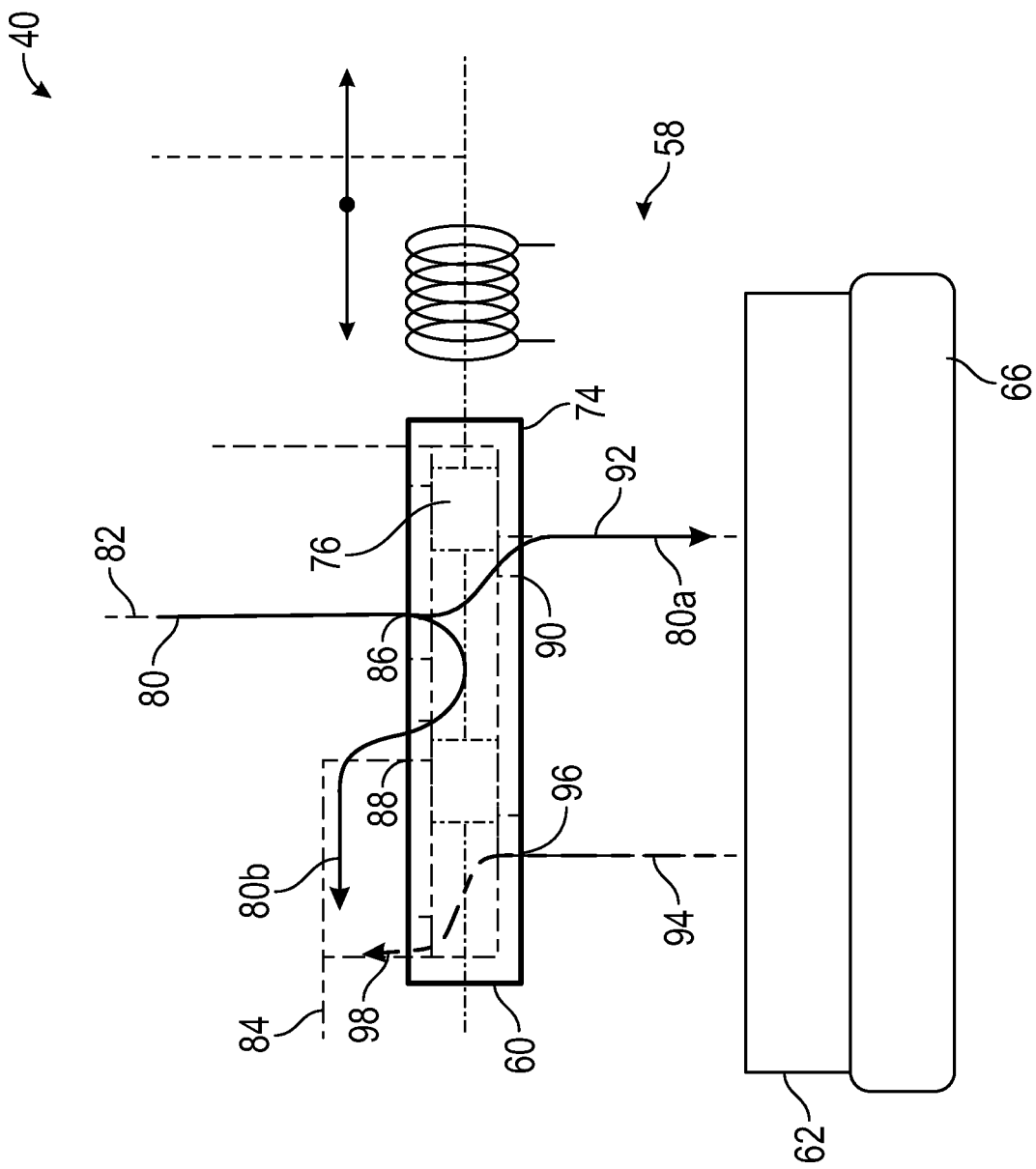
FIG. 4 is an illustration of another operational mode of a cooling system of an RESS.

As illustrated in FIG. 4, during such operating conditions where additional cooling of the RESS 38 is needed, such as direct current fast charging (DCFC) of the vehicle, sustained uphill towing operations, or high performance driving of the vehicle, the cooling system 40 is operated in a second mode, "RESS cooling mode". In the second mode, the spool valve 60 is operated to direct at least a first portion 80a of the flow of coolant 80 through the cold plate 62, to exchange thermal energy with the PCM 66 and thus cool the first portion 80*a*. A second portion 80*b* of the flow of coolant 80 may bypass the cold plate 62.

The flow of coolant 80 enters the valve housing 74 via the first inlet 86, and the valve piston 76 is positioned such that the first portion 80*a* exits the valve housing 74 via a second outlet 90 to be directed to the cold plate 62 along plate inlet pathway 92. The first portion 80*a* is cooled at the cold plate 62 and returns to the spool valve 60 via plate return pathway 94 and enters the valve housing 74 at a second inlet 96. The valve piston 76 is positioned such that the first portion 80*a* then exits a third outlet 98 in the valve housing 74 to the chiller pathway 84, where it may be mixed with the second portion 80*b* which exits the valve housing 74 via the first outlet 88. Depending on the amount of additional cooling needed by the RESS 38, the amount of the first portion 80*a* may be increased or decreased, which will correspondingly decrease or increase the amount of the second portion 80*b*. In some conditions, when particularly high levels of additional cooling is required, the entirety of the coolant flow 80 may be directed through the cold plate 62 as the first portion 80*a*.

Figure 5:
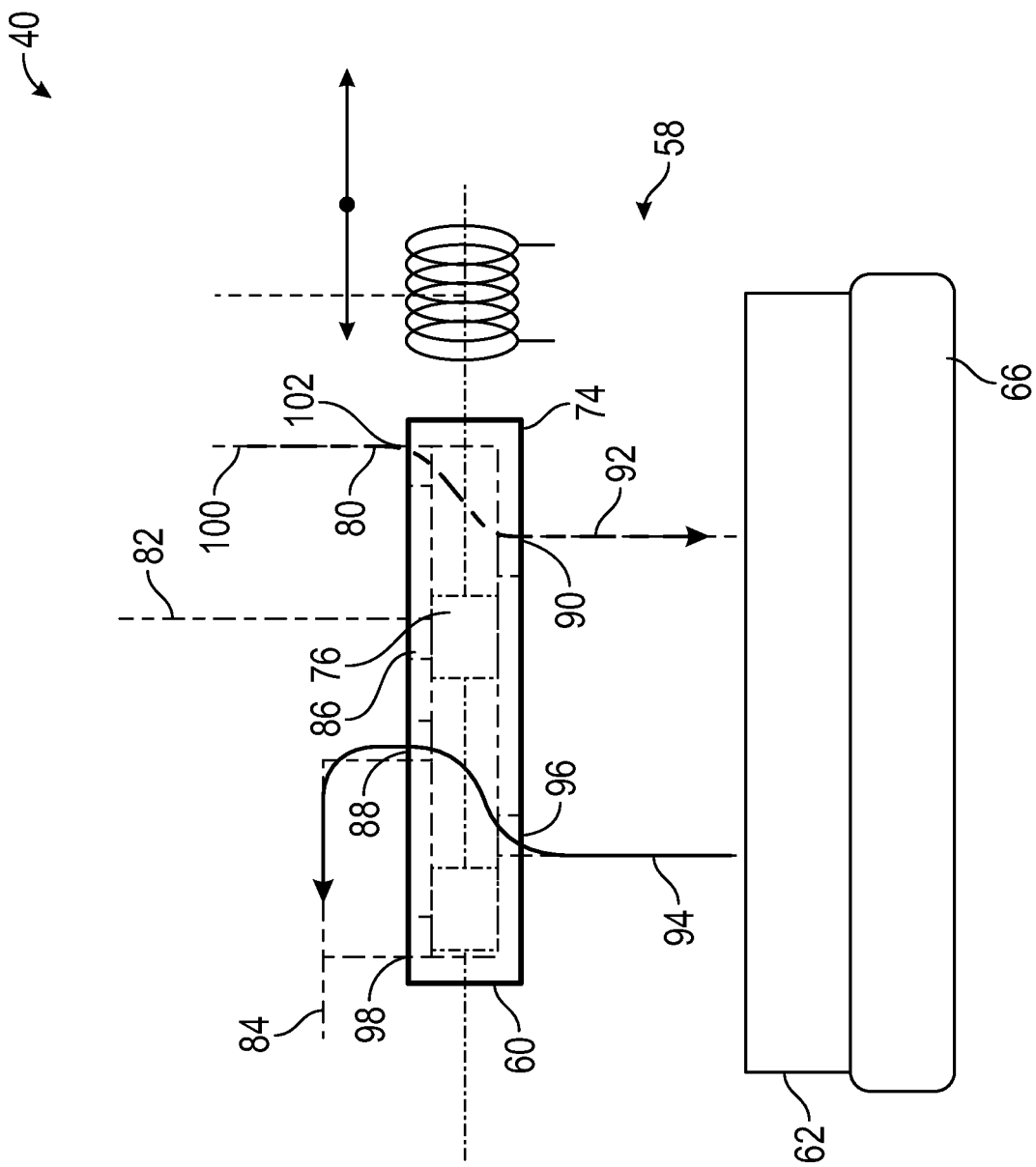
FIG. 5 is an illustration of yet another operational mode of a cooling system of an RESS.

Referring now to FIG. 5, the cooling system 40 may be operated in a third mode, in which the coolant flow 80 bypasses the RESS 38 and is directed to the spool valve 60 via a RESS bypass pathway 100. From the RESS bypass pathway 100, the coolant flow 80 enters the valve housing 74 via a third inlet 102. The valve piston 76 is positioned such that the coolant flow 80 is directed toward the cold plate 62 along the plate inlet pathway 92. The coolant flow 80 is used to provide cooling to the compartment 70 for, for example, cooling of food, drinks, or other items in the compartment 70. The coolant flow 80 returns to the spool valve 60 via the plate return pathway 94 and enters the valve housing 74 at the second inlet 96. The coolant flow 80 is then directed through the first outlet 88 and toward the chiller 42 via the chiller pathway 84.

Figure 6:
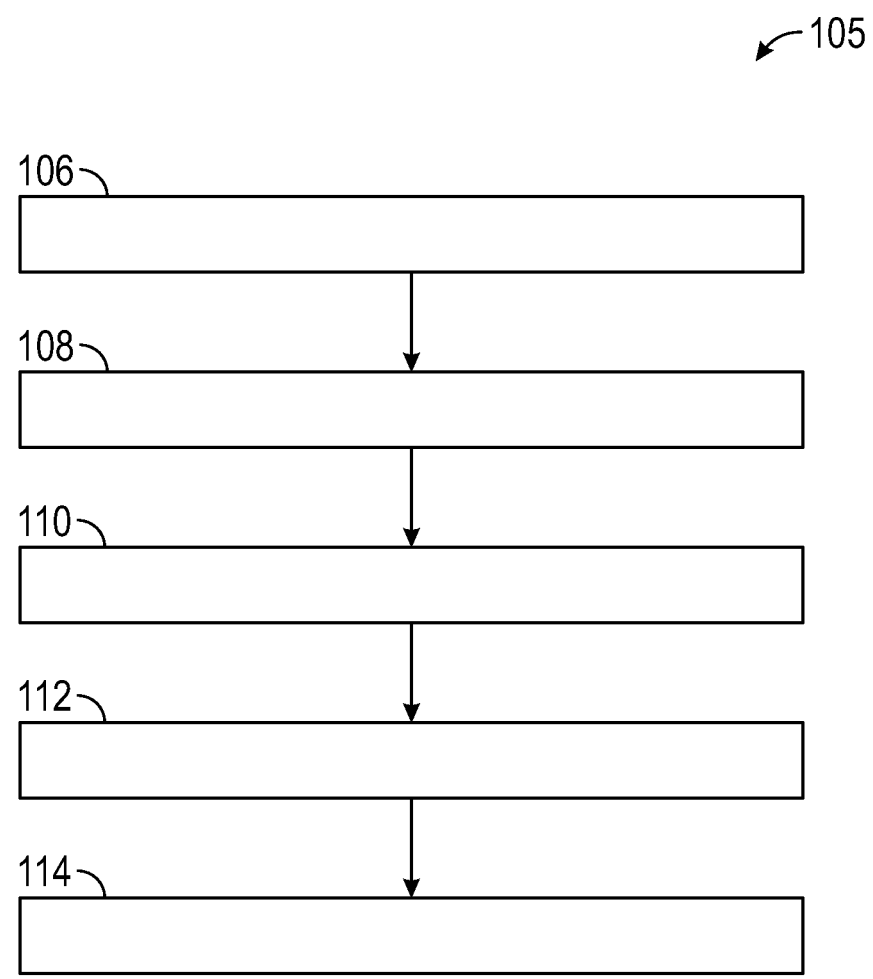
FIG. 6 illustrates a method of operating a cooling system of an RESS.

Referring again to FIG. 2, a controller 104 controls operation of the spool valve 60, and, in some instances, with interaction or inputs from the user. For example, a method 105 of operating the cooling system 40 will now be described with reference to FIG. 6. At step 106, the user anticipates or predicts that the vehicle will be subject to a high heat-rejection event such as high power DCFC, high-load towing, or high performance driving. Alternatively, the vehicle may anticipate such a high heat rejection event and suggests that the user add ice or other phase change material 66 to the compartment 70.

The user adds phase change material 66 to the compartment 70 at step 108. Ice is inexpensive, non-toxic, minimally corrosive and widely available at many locations where charging facilities exist. Improved performance may be achieved by adding salt to the ice to suppress its melting point. At step 110, the controller 104 detects a reduction in the temperature of the compartment 70 due to the addition of the PCM 66, via the temperature sensor 72 and prompts the user to confirm that they want to utilize the PCM 66 for heat rejection, enabling use of the cold plate 62. At step 112, the user begins the DCFC or other event, and the controller 104 operates the spool valve 62 appropriately to direct at least a portion of the coolant flow 80 toward the cold plate 62. Even after the PCM 66 melts, the specific heat capacity of the PCM 66 may still be utilized to absorb thermal energy up to a pre-selected temperature limit, such as 50 degrees Celsius. Once the PCM 66 is depleted, the vehicle may prompt the user to add more PCM 66. At step 114, once the event is completed the PCM 66, water, may be drained from the compartment 70 by opening a drain plug.

The features of the present disclosure allow the components of the cooling system 40 to be sized and configured for normal operating conditions of the vehicle, while providing higher cooling performance in the rare instances when it is needed. This is accomplished through minimal hardware additions and use of minimal packaging space in the vehicle to provide this enhanced capability.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A cooling system for a rechargeable energy storage system (RESS) of a vehicle, the cooling system comprising:
    a coolant circuit configured to direct a coolant flow through the RESS to remove thermal energy from the RESS;
    a refrigerant circuit through which a flow of refrigerant is circulated;
    a chiller fluidly connected to the coolant circuit and the refrigerant circuit configured to transfer thermal energy between the coolant circuit and the refrigerant circuit;
    an auxiliary circuit fluidly connected to the coolant circuit, the auxiliary circuit including:
    a cold plate having a first side and a second side opposite the first side; and
    a phase change material disposed at the second side of the cold plate;
    wherein the auxiliary circuit is configured such that at least a portion of the coolant flow is selectably directed across the first side of the cold plate for thermal exchanges with the phase change material; and one or more valves configured to selectably direct the at least a portion of the coolant flow through the auxiliary circuit.

2. The cooling system of claim 1, wherein the one or more valves is a spool valve.

3. The cooling system of claim 1, wherein the phase change material is one or more of ice, or frozen brine.

4. The cooling system of claim 1, wherein the auxiliary circuit is fluidly connected to the coolant circuit between the RESS and the chiller.

5. The cooling system of claim 1, further comprising an ambient heat exchanger disposed in the coolant circuit between the RESS and the one or more valves.

6. The cooling system of claim 1, further comprising a RESS bypass pathway operably connected to the one or more valves to selectably bypass the coolant flow around the RESS.

7. A vehicle comprising:
a body;
an electric motor supported relative to the body;
a rechargeable energy storage system (RESS) operably connected to the electric motor; and
a cooling system operably connected to the RESS, including:
a coolant circuit configured to direct a coolant flow through the RESS to remove thermal energy from the RESS;
a refrigerant circuit through which a flow of refrigerant is circulated;
a chiller fluidly connected to the coolant circuit and the refrigerant circuit configured to transfer thermal energy between the coolant circuit and the refrigerant circuit;
an auxiliary circuit fluidly connected to the coolant circuit, the auxiliary circuit including:
a cold plate having a first side and a second side opposite the first side; and
a phase change material disposed at the second side of the cold plate;
wherein the auxiliary circuit is configured such that at least a portion of the coolant flow is selectably directed across the first side of the cold plate for thermal exchanges with the phase change material; and
one or more valves configured to selectably direct the at least a portion of the coolant flow through the auxiliary circuit.

8. The vehicle of claim 7, wherein the one or more valves is a spool valve.

9. The vehicle of claim 7, wherein the phase change material is one or more of ice, or frozen brine.

10. The vehicle of claim 7, wherein the auxiliary circuit is fluidly connected to the coolant circuit between the RESS and the chiller.

11. The vehicle of claim 7, further comprising an ambient heat exchanger disposed in the coolant circuit between the RESS and the one or more valves.

12. The vehicle of claim 7, further comprising a RESS bypass pathway operably connected to the one or more valves to selectably bypass the coolant flow around the RESS.

13. The vehicle of claim 7, wherein the phase change material is disposed in a compartment of the body.

14. The vehicle of claim 13, wherein the cold plate is disposed at one or more of a bottom or side of the compartment.

15. A method of operating a cooling system of a rechargeable energy storage system (RESS) of a vehicle comprising:
directing a coolant flow of a coolant circuit from a chiller through the RESS to remove thermal energy from the RESS;
selectably directing at least a portion of the coolant flow across a first side of a cold plate disposed fluidly upstream of the chiller for thermal energy exchange with a phase change material disposed at a second side of the cold plate to increase a thermal energy rejection capability of the coolant flow.

16. The method of claim 15, wherein the selectable direction of at least a portion of the coolant flow is based on a determination that the vehicle is experiencing a high heat rejection event.

17. The method of claim 16, wherein the high heat rejection event is one or more of direct current fast charging, high load towing or high performance driving.

18. The method of claim 15, wherein the phase change material is one or more of ice, or frozen brine.

19. The method of claim 15, further comprising exchanging thermal energy between the coolant flow and a refrigerant flow of a refrigerant circuit at the chiller.

20. The method of claim 15 wherein a first portion of the coolant flow is directed across the cold plate and a second portion of the coolant flow bypasses the cold plate.

\* \* \* \* \*